United States Patent
Koravadi

(10) Patent No.: US 10,682,966 B2
(45) Date of Patent: Jun. 16, 2020

(54) VEHICLE LIGHT/DISPLAY CONTROL SYSTEM USING CAMERA

(71) Applicant: Magna Electronics Inc., Auburn Hills, MI (US)

(72) Inventor: Krishna Koravadi, Rochester Hills, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 0 days.

(21) Appl. No.: 16/190,204

(22) Filed: Nov. 14, 2018

(65) Prior Publication Data

US 2019/0143908 A1    May 16, 2019

Related U.S. Application Data

(60) Provisional application No. 62/643,784, filed on Mar. 16, 2018, provisional application No. 62/587,144, filed on Nov. 16, 2017.

(51) Int. Cl.
*B60R 11/04* (2006.01)
*B60R 1/00* (2006.01)
*B60R 11/00* (2006.01)
*H04N 7/18* (2006.01)

(52) U.S. Cl.
CPC ............... *B60R 11/04* (2013.01); *B60R 1/00* (2013.01); *H04N 7/18* (2013.01); *H04N 7/183* (2013.01); *B60Q 2300/314* (2013.01); *B60R 2011/0026* (2013.01); *B60R 2300/103* (2013.01); *B60R 2300/106* (2013.01)

(58) Field of Classification Search
None
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 6,201,642 B1 | 3/2001 | Bos | |
| 6,396,397 B1 | 5/2002 | Bos et al. | |
| 6,405,132 B1 | 6/2002 | Breed et al. | |
| 6,636,258 B2 | 10/2003 | Strumolo | |
| 6,690,268 B2 | 2/2004 | Schofield et al. | |
| 6,693,517 B2 | 2/2004 | McCarthy et al. | |
| 6,824,281 B2 | 11/2004 | Schofield et al. | |
| 6,975,246 B1 | 12/2005 | Trudeau | |
| 7,005,974 B2 | 2/2006 | McMahon et al. | |
| 7,038,577 B2 | 5/2006 | Pawlicki et al. | |

(Continued)

*Primary Examiner* — Jany Richardson
(74) *Attorney, Agent, or Firm* — Honigman LLP

(57) ABSTRACT

A vision system for a vehicle includes a camera disposed at the vehicle and having a field of view exterior of the vehicle. The camera includes a lens and an imager. A control includes a processor that processes image data captured by the camera. A light emitting device includes at least one light emitting diode. The light emitting device, when the at least one light emitting diode is powered, emits near infrared light at a region encompassed by the field of view of the camera. The control, responsive to processing of image data captured by the camera, determines an ambient light level exterior the vehicle. The control, responsive to the determined ambient light level, automatically controls intensity of the near infrared light emitted by the light emitting device.

19 Claims, 3 Drawing Sheets

(56) References Cited

U.S. PATENT DOCUMENTS

| | | |
|---|---|---|
| 7,145,519 B2 | 12/2006 | Takahashi et al. |
| 7,161,616 B1 | 1/2007 | Okamoto et al. |
| 7,195,381 B2 | 3/2007 | Lynam et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,480,149 B2 | 1/2009 | DeWard et al. |
| 7,580,795 B2 | 8/2009 | McCarthy et al. |
| 7,592,928 B2 | 9/2009 | Chinomi et al. |
| 7,720,580 B2 | 5/2010 | Higgins-Luthman |
| 7,855,755 B2 | 12/2010 | Weller et al. |
| 7,881,496 B2 | 2/2011 | Camilleri et al. |
| 8,256,821 B2 | 9/2012 | Lawlor et al. |
| 2009/0295181 A1 | 12/2009 | Lawlor et al. |
| 2010/0289885 A1* | 11/2010 | Lu .................. H04N 5/2258 348/61 |
| 2014/0160284 A1 | 6/2014 | Achenbach et al. |
| 2014/0226012 A1 | 8/2014 | Achenbach |
| 2015/0015713 A1 | 1/2015 | Wang et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0327398 A1 | 11/2015 | Achenbach et al. |
| 2016/0210853 A1 | 7/2016 | Koravadi |
| 2016/0381571 A1 | 12/2016 | Koravadi et al. |
| 2017/0104939 A1* | 4/2017 | Sun .................. H04N 5/33 |
| 2018/0158337 A1 | 6/2018 | Koravadi |
| 2018/0167551 A1 | 6/2018 | Koravadi |
| 2019/0016264 A1 | 1/2019 | Potnis et al. |

* cited by examiner

PRIOR ART

VEHICLE LIGHT/DISPLAY CONTROL SYSTEM USING CAMERA

CROSS REFERENCE TO RELATED APPLICATIONS

The present application claims priority of U.S. provisional application Ser. No. 62/643,784, filed Mar. 16, 2018, and U.S. provisional application Ser. No. 62/587,144, filed Nov. 16, 2017, which are hereby incorporated by reference herein in their entireties.

FIELD OF THE INVENTION

The present invention relates generally to a vehicle headlamp control system for a vehicle and, more particularly, to a vehicle headlamp control system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system or headlamp control system for a vehicle that utilizes one or more cameras (preferably one or more CMOS cameras) to capture image data representative of images exterior of the vehicle, and provides a method and apparatus to measure the light intensity of the environment utilizing the vehicle camera (via processing of image data captured by the vehicle camera) and to control the vehicle headlamps and/or infrared (IR) light emitting diodes (LEDs) for night vision and/or to control other vehicle displays and/or lights.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or lighting control system operates to capture images exterior of the vehicle and may process the captured image data to display images and to detect objects at or near the vehicle and in the predicted path of the vehicle, such as to assist a driver of the vehicle in maneuvering the vehicle in a forward or rearward direction. The system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
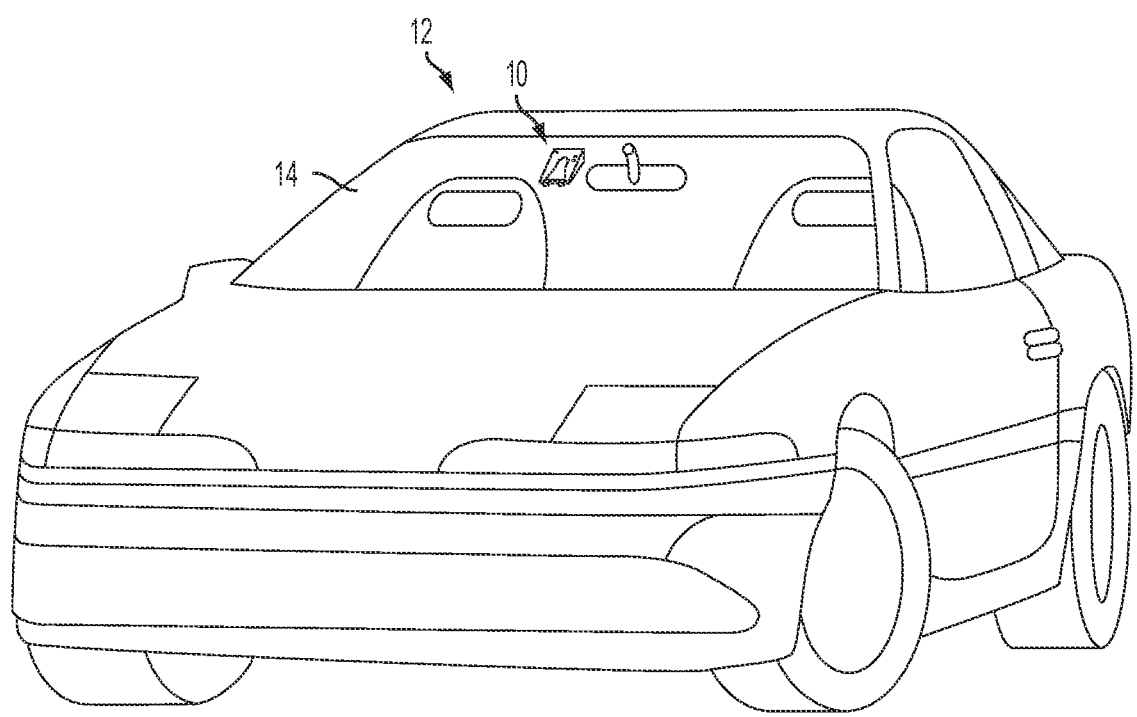
FIG. 1 is a perspective view of a vehicle with a vision system that incorporates a camera in accordance with the present invention.

Referring now to the drawings and the illustrative embodiments depicted therein, a vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Figure 2:
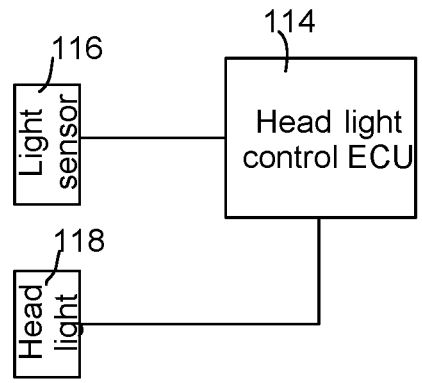
FIG. 2 is a schematic of a prior art headlamp control system that uses a light sensor to determine ambient light.

As shown in FIG. 2, a known system includes a light sensor 116 that measures the light intensity and sends that information to a head light control ECU 114, which controls the head light 118 of the vehicle. Optionally, the control 114 may use the output of the light sensor to control the display intensity of a human machine interface (HMI) display or the like in the vehicle.

Figure 3:
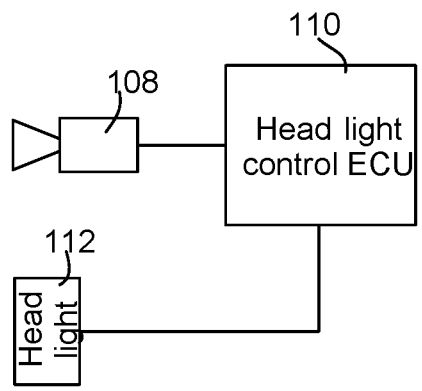
FIG. 3 is a schematic of a headlamp control system that uses a camera to control the headlights and/or a display of the vehicle in accordance with the present invention.

As shown in FIG. 3, the camera 108 of the vision system of the present invention uses imager exposure time, gain, pixel brightness and SNR (signal-to-noise ratio) to measure the light intensity and communicates data or information to the head light control ECU 110, which controls the head light 112. Optionally, the control 110 may use the output of the camera to control the display intensity of the HMI display or the like in the vehicle.

Figure 4:
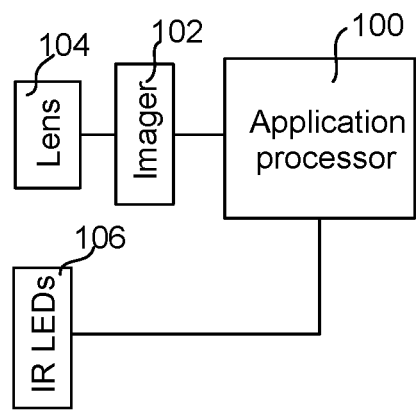
FIG. 4 is a schematic of an infrared light control system that uses a camera to control intensity of IR LEDs and/or a display of the vehicle in accordance with the present invention.

As shown in FIG. 4, a camera with night vision capability measures the illumination intensity of the environment utilizing a lens 104 and imager 102. An application processor 100 processes image data captured by the imager and automatically controls the IR LEDs 106 of the vehicle (such as IR LED headlamps or auxiliary lights of the vehicle) if the illumination intensity (as determined via processing by the processor of image data captured by the imager) is less than a threshold intensity level. The IR LEDs, when activated, illuminate regions within the field of view of the camera to enhance imaging of (and thus to enhance object detection at) those regions in low ambient lighting conditions.

Figure 5:
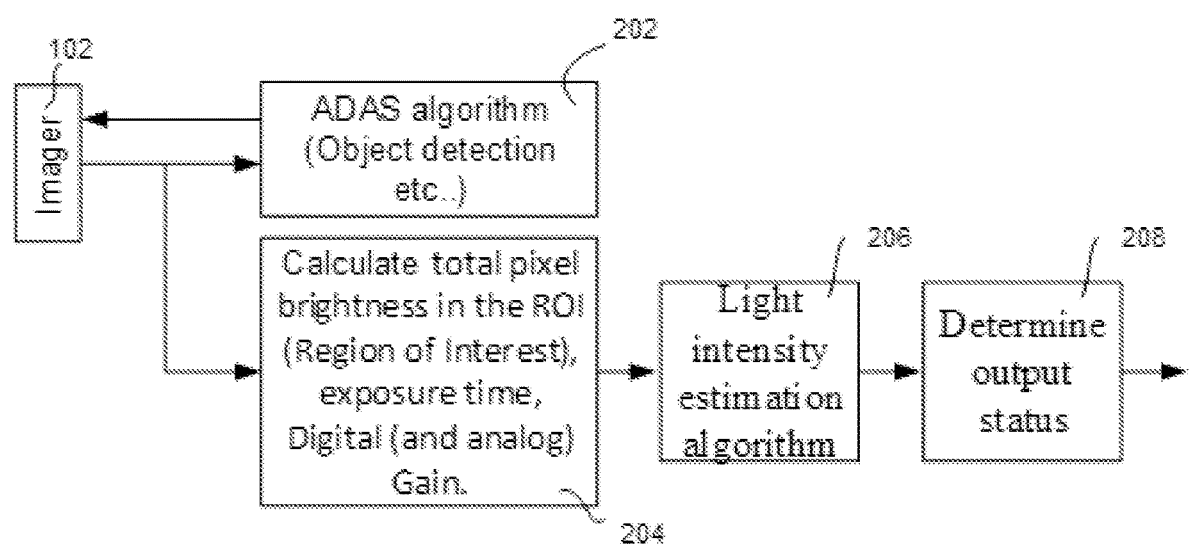
FIG. 5 is another schematic of an infrared light control system in accordance with the present invention.

As shown in FIG. 5, the imager 102 is controlled by an ADAS (advanced driving assist system) algorithm 202 (such as and advanced driving assist system that provides object detection, pedestrian detection and/or the like). An algorithm 204 calculates brightness and digital gain to estimate the total pixel brightness in a region of interest (ROI) and the digital and analog gain as a function of exposure time. This value is passed to a light intensity estimation algorithm 206 and an output status determining algorithm 208, which compares the brightness in the ROI and the digital gain to the calibratable threshold(s) to determine the output status to activate the infrared light emitting diode (IR LED) for night vision and/or to control other vehicle displays and/or lights.

The system may operate to determine the ambient light level when the IR LED is not activated. The system may capture image data when the IR LED is not activated for determining the ambient light level, and then may capture image data when the IR LED is activated (and is controlled to provide the appropriate intensity) for object detection or night vision or the like. The system adjusts the intensity of the IR LED (when the IR LED is activated) based at least in part on the determined ambient light level. For example, the system may increase the intensity of the IR LED when the determined ambient lighting condition is below a threshold level, and may decrease the intensity of the IR LED when the determined ambient lighting condition is greater than a threshold level low. The adjustment may be stepped (so that the IR LED is adjusted every time the determined ambient lighting condition is at a different threshold level (e.g., the IR LED intensity may be increased a predetermined amount for every predetermined increment in determined ambient lighting condition)) or may be continuously adjusted responsive to any change in ambient lighting level. The IR LED may be deactivated when the determined ambient light level is above a first threshold level, and then may be activated at a low level when the determined light level is at the first threshold level. Further adjustment of the IR LED intensity to higher intensity levels above the low level occurs as the ambient light level decreases to respective threshold levels.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture monochrome or color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 8,256,821;

7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
a camera disposed at a vehicle and having a field of view exterior and forward of the vehicle, said camera comprising a lens and an imager;
a control comprising a processor that processes image data captured by said camera;
wherein processing by said processor of image data captured by said camera determines a region of interest ahead of the vehicle within the field of view of said camera, wherein the determined region of interest is a sub-region of a larger region encompassed by the field of view of said camera;
a near infrared light emitting device comprising at least one light emitting diode, wherein said light emitting device, when said at least one light emitting diode is powered, emits near infrared radiation illuminating the larger region encompassed by the field of view of said camera;
wherein said control, responsive at least in part to processing of image data captured by said camera within the determined region of interest, determines an ambient light level exterior the vehicle at the determined region of interest;
wherein said control, responsive at least in part to the determined ambient light level at the determined region of interest being below a threshold level, automatically controls intensity of the near infrared radiation emitted by said near infrared light emitting device; and
wherein said control, with said control controlling intensity of the near infrared radiation emitted by said near infrared light emitting device to illuminate at least the determined region of interest, and responsive to processing of image data captured by said camera of the larger region, detects an object present within the larger region encompassed by the field of view of said camera.

2. The vision system of claim 1, wherein the field of view of said camera is forward of the vehicle.

3. The vision system of claim 2, wherein said near infrared light emitting device comprises a headlamp of the vehicle.

4. The vision system of claim 1, wherein said near infrared light emitting device comprises an auxiliary light of the vehicle.

5. The vision system of claim 1, wherein said control, responsive at least in part to the determined ambient light level, controls intensity of a display of the vehicle.

6. The vision system of claim 1, comprising a display operable to display images derived from image data captured by said camera, and wherein said control, responsive at least in part to the determined ambient light level, controls intensity of said display.

7. The vision system of claim 1, wherein said control determines the ambient light level exterior the vehicle when said near infrared light emitting device is deactivated.

8. The vision system of claim 1, wherein said control deactivates said near infrared light emitting device when the determined ambient light level is at or above a first threshold level.

9. The vision system of claim 8, wherein said control activates said near infrared light emitting device at a low level responsive to the determined ambient light level falling below the first threshold level.

10. The vision system of claim 9, wherein said control increases the intensity of the near infrared radiation emitted by said near infrared light emitting device from the low level to higher intensity levels responsive to the determined ambient light level decreasing to respective threshold levels below the first threshold level.

11. The vision system of claim 1, wherein said control estimates a total pixel brightness of the region of interest in the field of view of said camera, and wherein, at least in part responsive to the estimated total pixel brightness, said control controls intensity of the near infrared radiation emitted by said near infrared light emitting device.

12. The vision system of claim 11, wherein said control determines digital and analog gain as a function of exposure time.

13. The vision system of claim 12, wherein, at least in part responsive to the determined digital and analog gain, said control controls intensity of the near infrared radiation emitted by said near infrared light emitting device.

14. A vision system for a vehicle, said vision system comprising:
a camera disposed at a vehicle and having a field of view forward of the vehicle, said camera comprising a lens and an imager;
a control comprising a processor that processes image data captured by said camera;
wherein processing by said processor of image data captured by said camera determines a region of interest ahead of the vehicle within the field of view of said camera, wherein the determined region of interest is a sub-region of a larger region encompassed by the field of view of said camera;

a near infrared light emitting device comprising at least one light emitting diode, wherein said light emitting device, when said at least one light emitting diode is powered, emits near infrared radiation illuminating the larger region encompassed by the field of view of said camera;

wherein said control, responsive at least in part to processing of image data captured by said camera within the determined region of interest, determines an ambient light level exterior the vehicle at the determined region of interest;

wherein said control determines the ambient light level exterior the vehicle when said near infrared light emitting device is deactivated;

wherein said control, responsive at least in part to the determined ambient light level at the determined region of interest being below a threshold level, controls intensity of the near infrared radiation emitted by said near infrared light emitting device to illuminate at least the region of interest when the near infrared light emitting device is activated;

wherein said control, with said control controlling intensity of the near infrared radiation emitted by said near infrared light emitting device to illuminate at least the determined region of interest, and responsive to processing of image data captured by said camera of the larger region, detects an object present within the larger region encompassed by the field of view of said camera; and wherein said control, responsive at least in part to the determined ambient light level, controls intensity of a display of the vehicle.

15. The vision system of claim 14, wherein said control estimates a total pixel brightness of the region of interest in the field of view of said camera, and wherein, at least in part responsive to the estimated total pixel brightness, said control controls intensity of the near infrared radiation emitted by said near infrared light emitting device.

16. The vision system of claim 15, wherein said control determines digital and analog gain as a function of exposure time.

17. The vision system of claim 16, wherein, at least in part responsive to the determined digital and analog gain, said control controls intensity of the near infrared radiation emitted by said near infrared light emitting device.

18. A vision system for a vehicle, said vision system comprising:

a camera disposed at a vehicle and having a field of view forward of the vehicle, said camera comprising a lens and an imager;

a control comprising a processor that processes image data captured by said camera;

wherein processing by said processor of image data captured by said camera determines a region of interest ahead of the vehicle within the field of view of said camera, wherein the determined region of interest is a sub-region of a larger region encompassed by the field of view of said camera;

a near infrared light emitting device comprising at least one light emitting diode, wherein said light emitting device, when said at least one light emitting diode is powered, emits near infrared radiation illuminating the larger region encompassed by the field of view of said camera;

wherein said control, responsive at least in part to processing of image data captured by said camera within the determined region of interest, determines an ambient light level exterior the vehicle at the determined region of interest;

wherein said control, responsive at least in part to the determined ambient light level at the determined region of interest being below a threshold level, controls intensity of the near infrared radiation emitted by said near infrared light emitting device to illuminate at least the determined region of interest;

wherein said control deactivates said near infrared light emitting device when the determined ambient light level is at or above a first threshold level;

wherein said control activates said near infrared light emitting device at a low level responsive to the determined ambient light level falling below the first threshold level;

wherein said control increases the intensity of the near infrared radiation emitted by said near infrared light emitting device from the low level to higher intensity levels responsive to the determined ambient light level decreasing to respective threshold levels below the first threshold level; and wherein said control, with said control controlling intensity of the near infrared radiation emitted by said near infrared light emitting device to illuminate at least the determined region of interest, and responsive to processing of image data captured by said camera of the larger region, detects an object present within the larger region encompassed by the field of view of said camera.

19. The vision system of claim 18, wherein said control estimates a total pixel brightness of the region of interest in the field of view of said camera, and wherein, at least in part responsive to the estimated total pixel brightness, said control controls intensity of the near infrared radiation emitted by said near infrared light emitting device, and wherein said control determines digital and analog gain as a function of exposure time, and wherein, at least in part responsive to the determined digital and analog gain, said control controls intensity of the near infrared radiation emitted by said near infrared light emitting device.

\* \* \* \* \*

UNITED STATES PATENT AND TRADEMARK OFFICE
CERTIFICATE OF CORRECTION

PATENT NO. : 10,682,966 B2  
APPLICATION NO. : 16/190204  
DATED : June 16, 2020  
INVENTOR(S) : Krishna Koravadi Page 1 of 1

It is certified that error appears in the above-identified patent and that said Letters Patent is hereby corrected as shown below:

In the Claims

Column 6
Claim 1, Line 1, remove "automatically" after "level,"

Signed and Sealed this
Fourteenth Day of July, 2020

Andrei Iancu
*Director of the United States Patent and Trademark Office*